(12) United States Patent
Hoshikawa (10) Patent No.: US 9,670,872 B2
(45) Date of Patent: Jun. 6, 2017

(54) SUPPORTING STRUCTURE FOR INTERNAL COMBUSTION ENGINE

(71) Applicant: NISSAN MOTOR CO., LTD., Yokohama-shi, Kanagawa (JP)

(72) Inventor: Hiroaki Hoshikawa, Sagamihara-shi (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/783,340

(22) PCT Filed: Apr. 3, 2014

(86) PCT No.: PCT/JP2014/059798
§ 371 (c)(1),
(2) Date: Oct. 8, 2015

(87) PCT Pub. No.: WO2014/168065
PCT Pub. Date: Oct. 16, 2014

(65) Prior Publication Data
US 2016/0053715 A1    Feb. 25, 2016

(51) Int. Cl.
*F02F 7/00* (2006.01)
*F16C 9/02* (2006.01)
*F02B 75/04* (2006.01)
*F16C 9/04* (2006.01)
(Continued)

(52) U.S. Cl.
CPC .......... *F02F 7/0053* (2013.01); *F02B 75/045* (2013.01); *F02F 7/0019* (2013.01);
(Continued)

(58) Field of Classification Search
CPC .... F02B 75/048; F02B 75/045; F02B 75/047; F02B 75/32; F16C 9/02; F16C 2360/22;
(Continued)

(56) References Cited

U.S. PATENT DOCUMENTS 6,684,828 B2 *  2/2004  Ushijima .............. F02B 75/048
                                                123/197.3
6,941,923 B2 *  9/2005  Saito ................... F01M 11/0004
                                                123/195 C
(Continued)

FOREIGN PATENT DOCUMENTS

JP  2004-92448 A    3/2004
JP  2005-351261 A  12/2005
(Continued)

*Primary Examiner* — Long T Tran
(74) *Attorney, Agent, or Firm* — Foley & Lardner LLP (57) ABSTRACT

An internal combustion engine (1) is designed so that the center axis P of a cylinder (4) is offset relative to a main journal part (2a) of a crankshaft (2). A bearing cap (17) is designed so that the side toward the cylinder center axis from a main bearing part (18) is secured to a bulkhead (7) by two fastening bolts (24a, 24c) while the side away from the cylinder center axis from the main bearing part is secured to the bulkhead by one fastening bolt (24b) and that the bearing cap securing force on the side toward the cylinder center axis from the main bearing part (18) is greater than the bearing cap securing force on the side away from the cylinder center axis.

4 Claims, 5 Drawing Sheets

(52) U.S. Cl.
CPC .................. *F16C 9/02* (2013.01); *F16C 9/04* (2013.01); *F02F 2007/0041* (2013.01); *F16C 2360/22* (2013.01)

(58) Field of Classification Search
CPC ......... F16C 9/04; F02F 7/0053; F02F 7/0019; F02F 2007/0041
USPC .............. 123/48 A–48 R, 78 A–78 F, 195 R, 123/195 HC, 195 C, 198 E, 197.1–197.5, 123/291
See application file for complete search history.

(56) References Cited

U.S. PATENT DOCUMENTS

| | | | |
|---|---|---|---|
| 7,464,685 B2* | 12/2008 | Hochmayr | F02F 7/0053 123/195 R |
| 7,980,207 B2* | 7/2011 | Takahashi | F02B 75/048 123/48 B |
| 2002/0144665 A1* | 10/2002 | Ushijima | F02B 75/048 123/48 B |
| 2007/0131192 A1* | 6/2007 | Hochmayr | F02F 7/0053 123/195 HC |
| 2008/0087255 A1* | 4/2008 | Aoyama | F02D 13/023 123/48 B |
| 2009/0041398 A1* | 2/2009 | Tanaka | F02B 75/048 384/429 |

FOREIGN PATENT DOCUMENTS

| | | |
|---|---|---|
| JP | 2007-239497 A | 9/2007 |
| JP | 2007-315197 A | 12/2007 |
| JP | 2008-82248 A | 4/2008 |
| JP | 2009-293475 A | 12/2009 |
| JP | 2010-203345 A | 9/2010 |

* cited by examiner

SUPPORTING STRUCTURE FOR INTERNAL COMBUSTION ENGINE

TECHNICAL FIELD

The present invention relates to an internal combustion engine and, more particularly, to an improvement of a supporting structure established between a cylinder block and a bearing cap for rotatably supporting a crankshaft.

BACKGROUND OF THE INVENTION

In Patent Document 1, for example, there is disclosed a supporting structure for a crankshaft of an internal combustion engine.

A main journal part of the crankshaft is rotatably supported by a main bearing part constructed from a cylinder block and a bearing cap secured to the lower side of the cylinder block.

The bearing cap is fastened to the cylinder head by two fastening bolts disposed on both sides of the main bearing part. In general, these two fastening bolts are secured with an equal axial force, and located to have an equal distance from the main journal part when viewed from an axial direction of the crankshaft.

If the two fastening bolts disposed on both sides of the main bearing part are designed to have the same axial force, however, the axial force to be determined should be brought into conformity with the side requiring a greater axial force, and therefore one side of the main bearing part is to be secured with a larger axial force than necessary.

Thus, conventional internal combustion engines are susceptible to further improvement in securing the bearing cap to the cylinder block, so as not to generate a gap at the bearing cap.

REFERENCES ABOUT PRIOR ART

Patent Documents

Patent Document 1: Japanese Patent Application Publication No. 2007-315197

SUMMARY OF THE INVENTION

In an internal combustion engine designed so that a cylinder center axis is offset relative to a rotation center of a crankshaft, the bearing cap which supports the crankshaft in a rotatable manner is characterized by being secured to the cylinder block in such manner that, when viewed from an axial direction of the crankshaft, a bearing cap securing force on the side toward the cylinder center axis from the rotation center of the crankshaft is larger than a bearing cap securing force on the side away from the cylinder center axis or the side having no cylinder center axis.

If the cylinder center axis is designed to be offset with respect to the crankshaft, a load not parallel with the cylinder center axis (when viewed from an axial direction of the crankshaft) is to act on the rotation center of the crankshaft.

Hence the bearing cap is subjected to deformations resulting from the load and accordingly a portion of the cylinder center axis side of the bearing cap is apt to go away from the bulkhead when viewed from the axial direction of the crankshaft. With this, the bearing cap is to be pressed against the cylinder head at a portion of the side away from the cylinder center axis. In other words, the bearing cap has a fear of the occurrence of a gap at the cylinder center axis side when viewed from the axial direction of the crankshaft.

According to the present invention, the bearing cap is designed so that the side toward the cylinder center axis is larger in bearing cap securing force than the side away from the cylinder center axis when viewed from the axial direction of the crankshaft. In an internal combustion engine so designed that the cylinder center axis is offset with respect to the rotation center of the crankshaft, therefore, it is possible to prevent the bearing cap from generating a gap.

MODE(S) FOR CARRYING OUT THE INVENTION

Referring now to the accompanying drawings, an embodiment of the present invention will be explained below.

Figure 1:
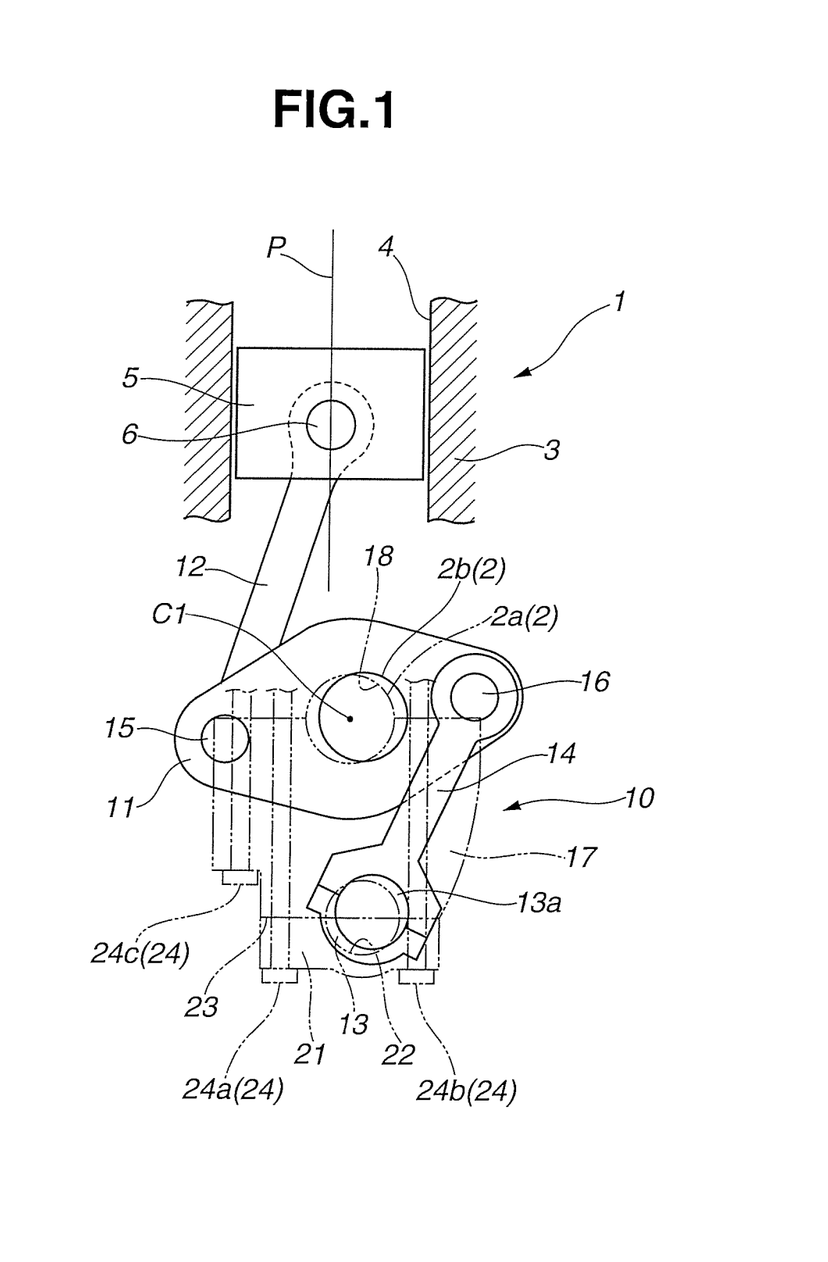
FIG. 1 An explanatory view for schematically showing a general configuration of a first embodiment of an internal combustion engine according to the present invention.
Figure 2:
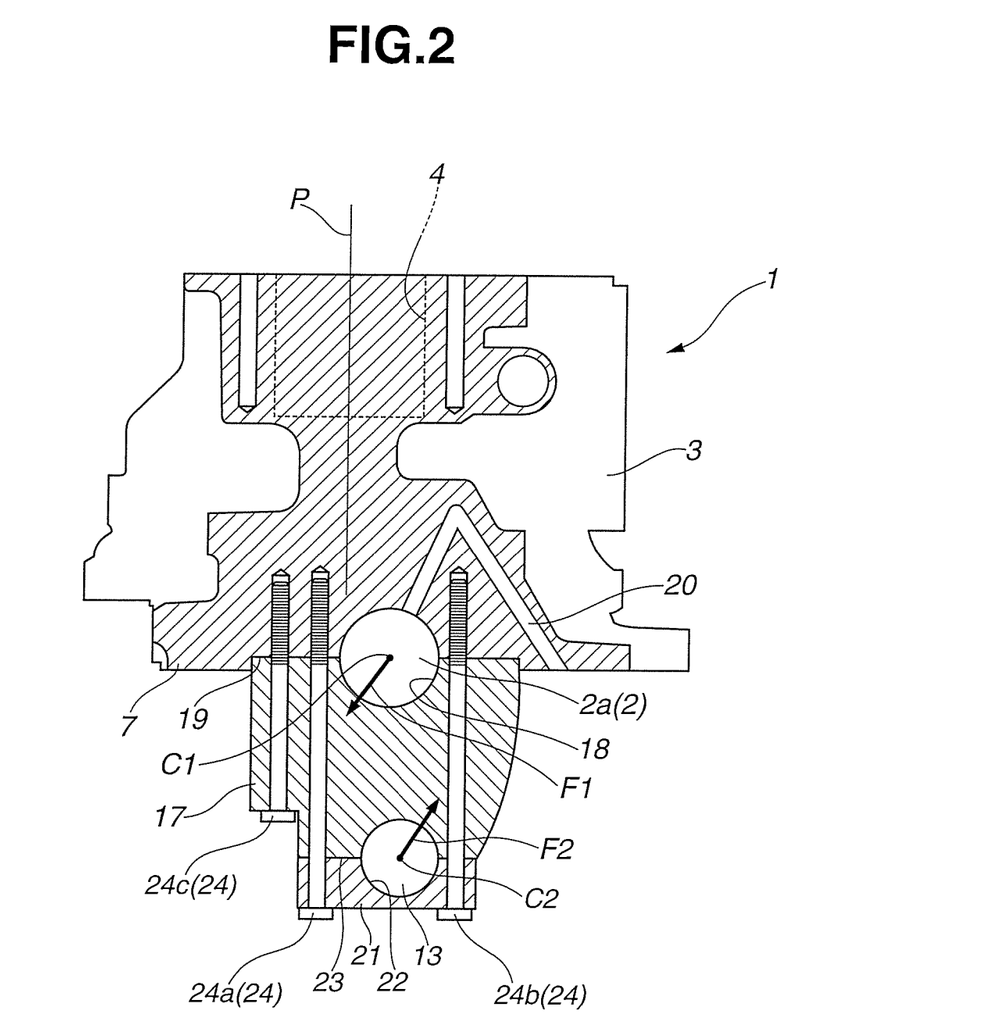
FIG. 2 A cross-sectional view of a main part of the first embodiment of the internal combustion engine according to the present invention.
Figure 3:
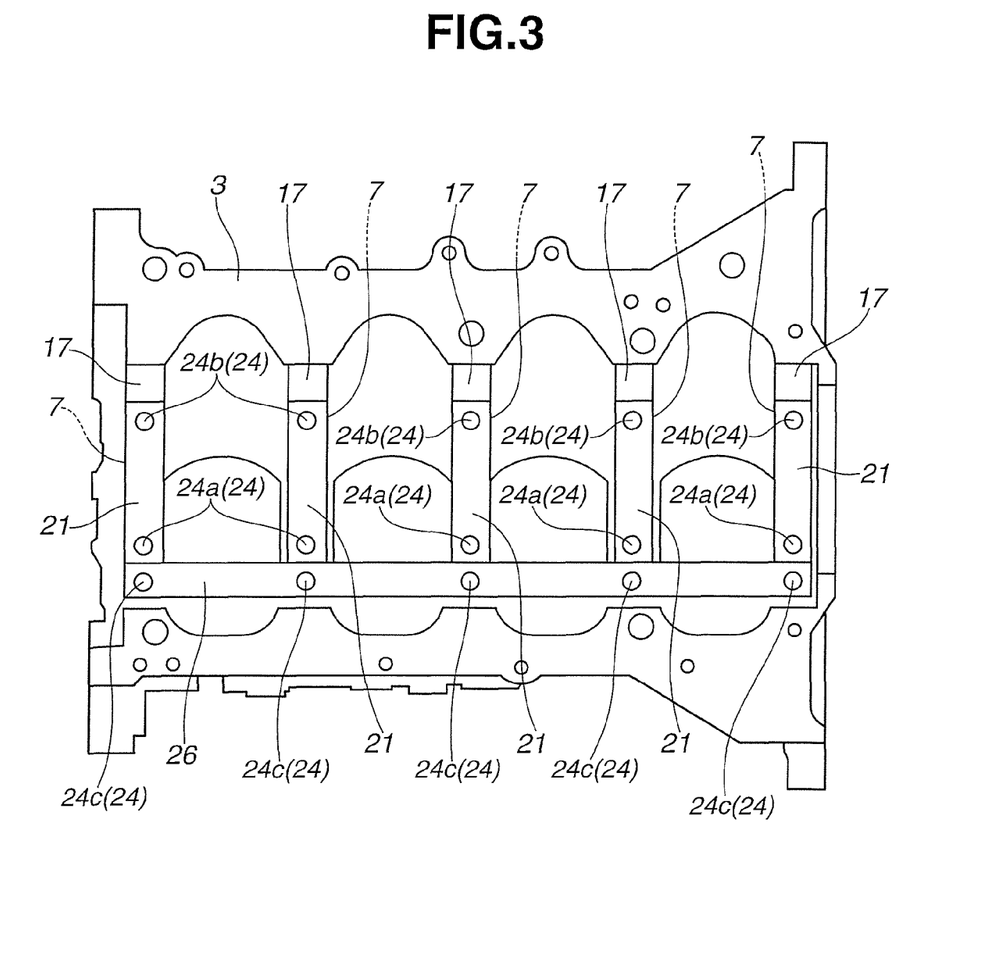
FIG. 3 A schematic view of a configuration including a cylinder block, taken from the bottom side thereof.

Referring to FIGS. 1 to 3, there will firstly be explained a first embodiment of the present invention. FIG. 1 is an explanatory view for schematically showing a general configuration of a first embodiment of internal combustion engine 1 according to the present invention. FIG. 2 is a cross-sectional view of a main part of the first embodiment of internal combustion engine 1 according to the present invention. FIG. 3 is a schematic view of a configuration of cylinder block 3 in the first embodiment of internal combustion engine 1 according to the present invention, taken from the bottom side of cylinder block 3. Incidentally, the first embodiment shows an example applying an internal combustion engine of an inline-four engine type.

Internal combustion engine 1 is designed so that center axis P of cylinder 4 that cylinder block 3 has is offset relative to main journal part 2a serving as the center of rotation of crankshaft 2.

The first embodiment of internal combustion engine 1 is provided with variable compression ratio mechanism 10 with which the top dead center position of piston 5 reciprocating in cylinder 4 becomes adjustable.

This variable compression ratio mechanism 10 is provided by utilizing a multi-link type piston crank mechanism where piston 5 is connected to crankpin 2b of crankshaft 2 through a plurality of links, and comprised of: lower link 11 rotatably attached to crankpin 2b; upper link 12 connecting lower link 11 to piston 5; control shaft 13 formed having eccentric shaft section 13a; and control link 14 connecting eccentric shaft section 13 to lower link 11.

Upper link 12 is provided to have one end rotatably attached to piston pin 6, and the other end rotatably attached to lower link 11 through first connecting pin 15. Control link 14 has one end rotatably connected to lower link 11 through a second connecting pin 16, and the other end rotatably attached to eccentric shaft section 13a.

Control shaft 13 is disposed parallel with crankshaft 2 and supported by cylinder block 3 in a rotatable manner. This control shaft 13 is rotatably driven by an actuator (not illustrated), and its rotation position is controlled. Incidentally, the actuator may be either an electric motor or a hydraulically-powered actuator, for example.

As shown in FIG. 2, main journal part 2a of crankshaft 2 is rotatably supported at main bearing part 18 consisting of bulkhead 7 with which cylinder block 3 is formed, and bearing cap 17 secured to the lower end of bulkhead 7. More specifically, main bearing part 18 is constructed from a pair of semicylindrical depressions formed at contact surface 19 to face toward each other, the contact surface 19 being established by bringing the bottom surface of bulkhead 7 and the top surface of bearing cap 17 into contact with each other.

Contact surface 19 is designed to be perpendicular to center axis P of the cylinder. Cylinder block 3 is formed with oil-supplying path 20 therein, and a lubricating oil is supplied to main bearing part 18 through oil-supplying path 20. Additionally, as shown in FIG. 3, bulkhead 7 is intermittently formed along the cylinder arrangement direction. More specifically, bulkhead 7 is provided in the cylinder arrangement direction between the cylinders and at both ends of the cylinder arrangement.

Control shaft 13 of variable compression ratio mechanism 10 is rotatably supported at second main bearing part 22 formed by bearing cap 17 and second bearing cap 21 secured to the lower end of bearing cap 17.

In other words, second main bearing part 22 is constructed from a pair of semicylindrical depressions formed at second contact surface 23 to face toward each other, the second contact surface 23 being established by bringing the bottom surface of bearing cap 17 and the top surface of second bearing cap 21 into contact with each other. Second contact surface 23 is designed to be perpendicular to center axis P of the cylinder.

Second bearing cap 21 is secured to bulkhead 7 together with bearing cap 27 by two fastening bolts 24a, 24b penetrating bearing cap 17, as shown in FIGS. 2 and 3.

As shown in FIG. 2, fastening bolts 24a, 24b are disposed at both sides of main bearing part 18 or second main bearing part 22 when viewed from the axial direction of the crankshaft. Moreover, as shown in FIGS. 2 and 3, fastening bolts 24a, 24b are so located as to be symmetric with respect to main bearing part 18, or located to be equal in distance from center C1 of main journal part 2a.

Bearing cap 17 is designed so that, when viewed from the axial direction of the crankshaft, the side toward the cylinder center axis from main bearing part 18 (i.e., the left side in FIG. 2) is secured to bulkhead 7 by fastening bolt 24c disposed farther away from main bearing part 18 than fastening bolt 24a.

Furthermore, in the present embodiment, these fastening bolts 24a, 24b, 24c are secured to bulkhead 7 with an axial force identical to each other.

In the present embodiment, bearing cap 17 is connected to each other by bearing beam 26 continuously extending in the cylinder arrangement direction as shown in FIG. 3.

Since internal combustion engine 1 of the first embodiment is designed so that cylinder center axis P is offset relative to main journal part 2a toward left in FIG. 2, a load directed toward the lower side of the cylinder center axis side (the left side of FIG. 2) is to act on center C1 of main journal part 2a when viewed from the axial direction of the crankshaft. In other words, on bearing cap 17, a load not parallel with cylinder center axis P is to act.

In the first embodiment, control shaft 13 of variable compression ratio mechanism 10, which is in association with piston 5, is rotatably supported by bearing cap 17 and second bearing cap 21 secured to the lower end of bearing cap 17; therefore, a load directed toward the upper side of the side having no cylinder center axis P (the right side of FIG. 2) is to act on rotation center C2 of control shaft 13 as shown in FIG. 2. Loads F1, F2 as illustrated in FIG. 2 show loads to be inputted into main journal part 2a and control shaft 13 when the maximum compressive load is generated as an example.

Hence, bearing cap 17 of the first embodiment is subjected to deformations resulting from loads F1, F2, and its side toward the cylinder center axis from main bearing part 18 (i.e., the left side of bearing cap 17 in FIG. 2) is apt to go away from bulkhead 7 when viewed from the axial direction of the crankshaft. With this, the side away from the cylinder center axis from the main bearing part 18 (i.e., the right side of bearing cap 17 in FIG. 2) is to be pressed against bulkhead 7.

Namely, unless bearing cap 17 is secured to bulkhead 7 with greater securing force on the cylinder center axis side (the left side in FIG. 2) than on the side away from the cylinder center axis when viewed from the axial direction of the crankshaft, there arises a fear that a gap originating from contact surface 19 is generated at the cylinder center axis side (the left side in FIG. 2).

Particularly in the case where internal combustion engine 1 is equipped with multi-link type variable compression ratio mechanism 10 like the first embodiment, a load to be applied to main journal part 2a gets increased as compared with a normal internal combustion engine (i.e., an internal combustion engine of a single-link type piston crank mechanism) due to a difference of lever ratio. In order to prevent the occurrence of the gap originating from contact surface 19 at the cylinder center axis side (the left side in FIG. 2), it is therefore necessary to fasten contact surface 19 at the cylinder center axis side (the left side in FIG. 2) with greater securing force.

In view of the above, bearing cap 17 of the first embodiment is designed so that the side toward the cylinder center axis from main bearing part 18 (the left side in FIG. 2) is secured to bulkhead 7 by two fastening bolts 24a, 24c while the side away from the cylinder center axis from the main bearing part (the right side in FIG. 2) is secured to the bulkhead by one fastening bolt 24b, thereby making the bearing cap securing force on the side toward the cylinder center axis from main bearing part 18 greater than the bearing cap securing force on the side away from the cylinder center axis.

By the way, in the present specification, a bearing cap securing force per one fastening bolt 24 is defined as the product of a distance from the center axis of fastening bolt 24 to center C1 of main journal part 2a and an axial force of fastening bolt 24.

Hence the bearing cap securing force of bearing cap 17 of the first embodiment at the side toward the cylinder center axis from main bearing part 18 (the left side in FIG. 2) is the sum of the product of an axial force of fastening bolt 24a and a distance from fastening bolt 24a to center C1 of main journal part 2a and the product of an axial force of fastening bolt 24c and a distance from fastening bolt 24c to center C1 of main journal part 2a. Meanwhile, the bearing cap securing force of bearing cap 17 of the first embodiment at the side away from the cylinder center axis (the right side in FIG. 2) is the product of an axial force of fastening bolt 24*b* and a distance from fastening bolt 24*b* to center C1 of main journal part 2*a*.

The bearing cap securing force on the side toward the cylinder center axis is designed so as not to generate a gap at the cylinder center axis side of bearing cap 17 even when the maximum compressive load is generated. Meanwhile, the bearing cap securing force on the side away from the cylinder center axis is designed smaller than the bearing cap securing force on the side toward the cylinder center axis so as to prevent bearing cap 17 from generating a gap at the side away from the cylinder center axis.

With this, it is possible in the first embodiment to prevent the occurrence of a gap originating from contact surface 19 formed between bearing cap 17 and bulkhead 7, even if bearing cap 17 is subjected to deformations resulting from loads F1, F2 as discussed above.

Since the bearing cap securing force on the side away from the cylinder center axis can be held to the required minimum, it becomes also possible to reduce the number of fastening bolt 24 used for securing bearing cap 17 at the side away from the cylinder center axis as compared with the number of fastening bolt 24 used on the side toward the cylinder center axis. Accordingly, it is not necessary to increase a width direction dimension of cylinder block 3 for fastening bolt 24*b* that secures the side away from the cylinder center axis, so that cylinder block 3 may generally be prevented from increase in size.

Since the number of fastening bolt 24 used for securing bearing cap 17 at the side away from the cylinder center axis can be reduced as compared with the number of fastening bolt 24 used on the side toward the cylinder center axis, it is possible to provide oil-supplying path 20 to cylinder block 3 at the side away from the cylinder center axis (at the right side in FIG. 2) so as not to interfere fastening bolt 24*b* which secures bearing cap 17 at the side away from the cylinder center axis, without increasing a width direction dimension of cylinder block 3.

Moreover, all of fastening bolts 24*a*, 24*b*, 24*c* for securing bearing cap 17 to bulkhead 7 are fastened with the same axial force, which makes the management of axial forces of fastening bolts 24 convenient and therefore improves the workability at the time of securing bearing cap 17 to bulkhead 7.

Additionally, it is possible to relatively decrease the axial force per one fastening bolt of fastening bolts 24*a*, 24*c* (requiring a relatively large bearing cap securing force because these bolts secure the side toward the cylinder center axis) by making the axial forces of all of fastening bolts 24*a*, 24*b*, 24*c* identical; therefore, the hardness, strength and the like required of a bearing surface of a bolt disposed on the cylinder center axis side of bearing cap 17 can be decreased relatively. Even if variable compression ratio mechanism 10 of a multi-link type which mechanism is relatively large in input into main journal part 2*a* is applied to internal combustion engine 1, a weight reduction of bearing cap 17 is feasible by changing an iron-based material to an aluminum one.

Hereinafter, other embodiments of the present invention will be discussed, wherein the same element as in the above-mentioned first embodiment is given the same reference numeral, and redundant explanations are omitted.

Figure 4:
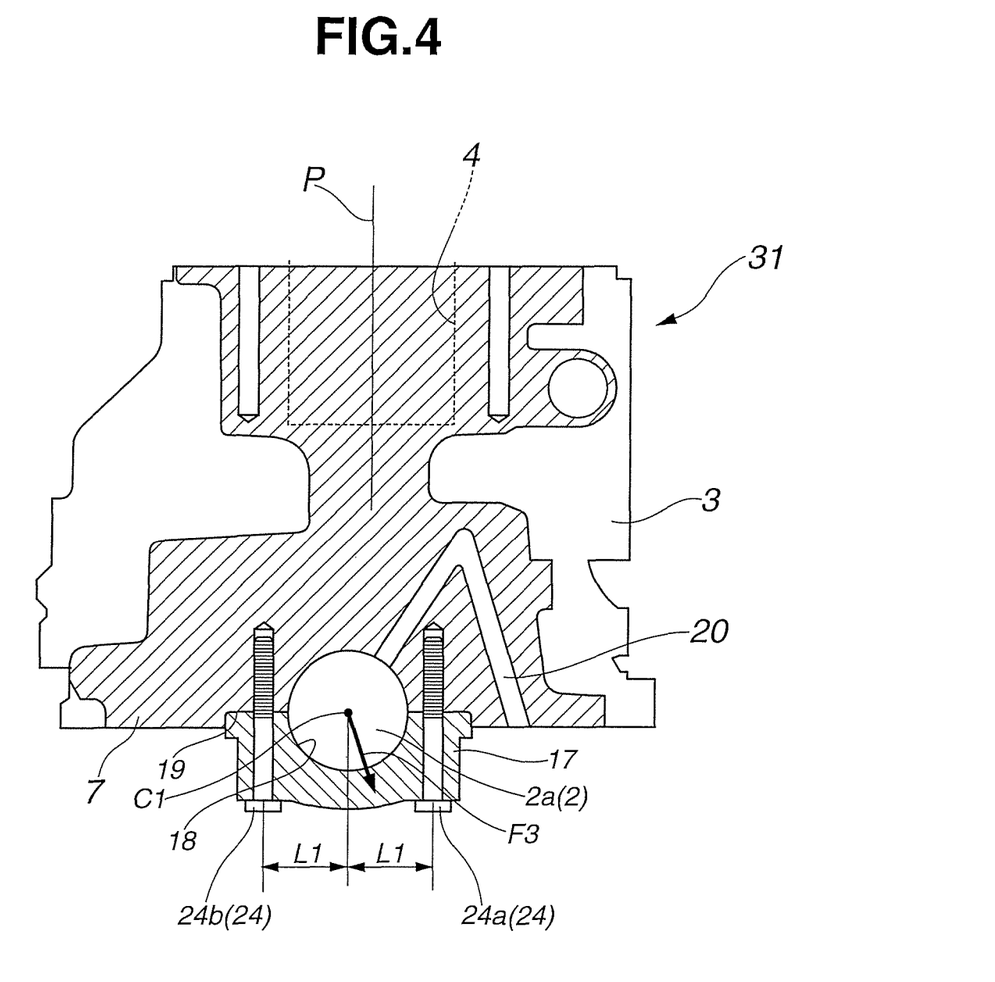
FIG. 4 A cross-sectional view of a main part of a second embodiment of the internal combustion engine according to the present invention.

A second embodiment as shown in FIG. 4 is an example applying internal combustion engine 31 equipped with a general single-link type piston crank mechanism.

Internal combustion engine 31 of the second embodiment is also designed so that center axis P of cylinder 4 that cylinder block 3 has is offset relative to main journal part 2*a* serving as the center of rotation of crankshaft 2.

Also in internal combustion engine 31 of the second embodiment, main journal part 2*a* of crankshaft 2 is rotatably supported at main bearing part 18 consisting of bulkhead 7 with which cylinder block 3 is formed, and bearing cap 17 secured to the lower end of bulkhead 7 as shown in FIG. 4.

Bearing cap 17 is secured to bulkhead 7 by two fastening bolts 24*a*, 24*b* as shown in FIG. 4.

As shown in FIG. 4, fastening bolts 24*a*, 24*b* are disposed at both sides of main bearing part 18 when viewed from the axial direction of the crankshaft. Moreover, as shown in FIG. 4, fastening bolts 24*a*, 24*b* are so located as to be symmetric with respect to main bearing part 18, or located to be equal in distance from center C1 of main journal part 2*a* (or designed to respectively have distance L1).

In the second embodiment, the axial force of fastening bolt 24*a* disposed on the side toward the cylinder center axis is designed so as to be greater that the axial force of fastening bolt 24*b* disposed on the side away from the cylinder center axis.

In other words, the second embodiment is designed so that the bearing cap securing force on the side toward the cylinder center axis is relatively large, by making the axial force of fastening bolt 24*a* on the side toward the cylinder center axis (the right side in FIG. 4) relatively large.

Incidentally, in the second embodiment, fastening bolts 24*a*, 24*b* are secured with an axial force different from each other. Therefore fastening bolts 24*a*, 24*b* each are tightened within elastic region.

Since the second embodiment is designed such that cylinder center axis P is offset relative to main journal part 2*a* of crankshaft 2 toward right in FIG. 4, a load directed toward the lower side of the cylinder center axis side (the right side of FIG. 4) is to act on center C1 of main journal part 2*a* when viewed from the axial direction of the crankshaft. In other words, on bearing cap 17, a load not parallel with cylinder center axis P is to act. Load F3 as illustrated in FIG. 4 shows a load to be inputted into main journal part 2*a* when the maximum compressive load is generated, as an example.

Hence, bearing cap 17 of the second embodiment is subjected to deformations resulting from load F3, and its side toward the cylinder center axis from main bearing part 18 (i.e., the right side of bearing cap 17 in FIG. 4) is apt to go away from bulkhead 7 when viewed from the axial direction of the crankshaft. With this, the side away from the cylinder center axis from the main bearing part 18 (i.e., the left side of bearing cap 17 in FIG. 4) is to be pressed against bulkhead 7.

Namely, unless bearing cap 17 is secured to bulkhead 7 with greater securing force on the cylinder center axis side (the right side in FIG. 4) than on the side away from the cylinder center axis (the left side in FIG. 4) when viewed from the axial direction of the crankshaft, there arises a fear that a gap originating from contact surface 19 is generated at the cylinder center axis side (the right side in FIG. 4).

In view of the above, in the second embodiment, the axial force of fastening bolt 24*a* securing the side toward the cylinder center axis from main bearing part 18 (the right side in FIG. 4) is designed to be greater than the axial force of fastening bolt 24*b* securing the side away from the cylinder center axis from main bearing part 18 (the left side in FIG. 4), thereby making the bearing cap securing force on the side toward the cylinder center axis from main bearing part 18 (or main journal part 2*a*) larger than the bearing cap securing force on the side away from the cylinder center axis.

In the second embodiment, the bearing cap securing force on the side toward the cylinder center axis is designed so as not to generate a gap at the cylinder center axis side of bearing cap 17 when the maximum compressive load is generated. Meanwhile, the bearing cap securing force on the side away from the cylinder center axis is designed smaller than the bearing cap securing force on the side toward the cylinder center axis so as to prevent bearing cap 17 from generating a gap at the side away from the cylinder center axis.

With this, it is possible in the second embodiment to prevent the occurrence of a gap originating from contact surface 19 formed between bearing cap 17 and bulkhead 7, even if bearing cap 17 is subjected to deformations resulting from load F3 as discussed above.

Furthermore, bearing cap 17 is secured by the required minimum number of fastening bolts 24a, 24b (i.e., two fastening bolts). It is therefore possible to decrease a width direction dimension required of cylinder block 3 to secure bearing cap 17 by fastening bolts 24, thereby generally allowing preventing cylinder block 3 from increasing in size.

Figure 5:
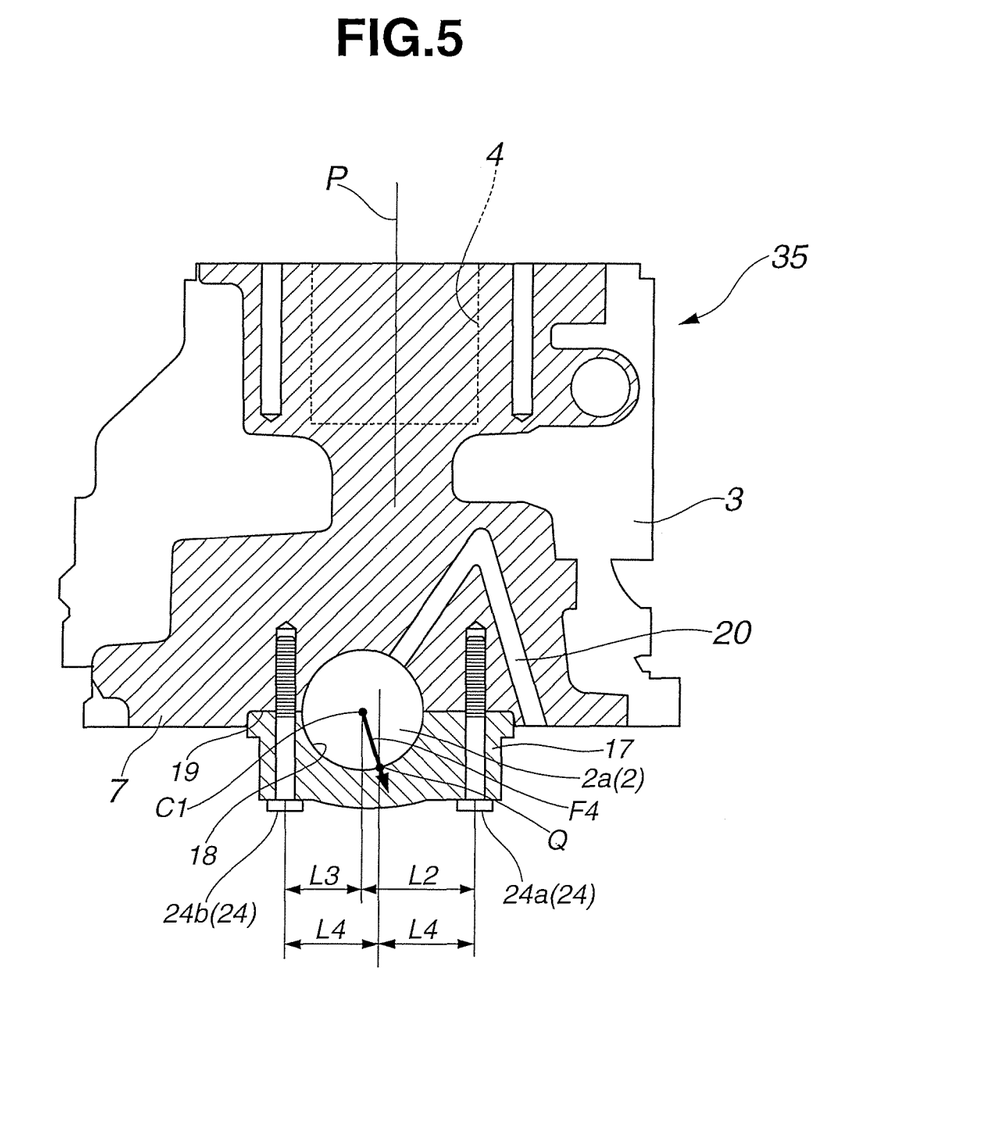
FIG. 5 A cross-sectional view of a main part of a third embodiment of the internal combustion engine according to the present invention.

Referring now to FIG. 5, a third embodiment of the present invention will be explained below. The third embodiment is an example applying internal combustion engine 35 also equipped with a general single-link type piston crank mechanism.

Internal combustion engine 35 of the third embodiment is also designed so that center axis P of cylinder 4 that cylinder block 3 has is offset relative to main journal part 2a serving as the center of rotation of crankshaft 2.

Also in internal combustion engine 35 of the third embodiment, main journal part 2a of crankshaft 2 is rotatably supported at main bearing part 18 consisting of bulkhead 7 with which cylinder block 3 is formed, and bearing cap 17 secured to the lower end of bulkhead 7 as shown in FIG. 5.

Bearing cap 17 is secured to bulkhead 7 by two fastening bolts 24a, 24b as shown in FIG. 5.

Fastening bolts 24a, 24b in the third embodiment are disposed at both sides of main bearing part 18 when viewed from the axial direction of the crankshaft. And as shown in FIG. 5, a distance L3 between fastening bolt 24b securing bearing cap 17 at the side away from the cylinder center axis and center C1 of main journal part 2a is designed to be small as compared with a distance L2 between fastening bolt 24a securing the cylinder center axis side of bearing cap 17 and center C1 of main journal part 2a. Additionally, in the third embodiment, the axial force of fastening bolt 24a disposed on the cylinder center axis side and the axial force of fastening bolt 24b disposed on the side away from the cylinder center axis are designed to be identical to each other.

In other words, in the third embodiment, a distance between fastening bolt 24a securing bearing cap 17 at the cylinder center axis side (the right side in FIG. 5) and center C1 of main journal part 2a is designed to be relatively large, thereby making the bearing cap securing force on the cylinder center axis side relatively large.

Since the third embodiment is designed such that cylinder center axis P is offset relative to main journal part 2a of crankshaft 2 toward right in FIG. 5, a load directed toward the lower side of the cylinder center axis side (the right side of FIG. 5) is to act on center C1 of main journal part 2a when viewed from the axial direction of the crankshaft. In other words, on bearing cap 17, a load not parallel with cylinder center axis P is to act. Load F4 as illustrated in FIG. 5 shows a load to be inputted into main journal part 2a when the maximum compressive load is generated, as an example.

Hence, bearing cap 17 of the third embodiment is subjected to deformations resulting from load F4, and its side toward the cylinder center axis from main bearing part 18 (i.e., the right side of bearing cap 17 in FIG. 5) is apt to go away from bulkhead 7 when viewed from the axial direction of the crankshaft. With this, the side away from the cylinder center axis from the main bearing part 18 (i.e., the left side of bearing cap 17 in FIG. 5) is to be pressed against bulkhead 7.

Namely, unless bearing cap 17 is secured to bulkhead 7 with greater securing force on the cylinder center axis side (the right side in FIG. 5) than on the side away from the cylinder center axis (the left side in FIG. 5) when viewed from the axial direction of the crankshaft, there arises a fear that a gap originating from contact surface 19 is generated at the cylinder center axis side (the right side in FIG. 5).

In view of the above, in the third embodiment, fastening bolt 24a securing the cylinder center axis side of bearing cap 17 (the right side in FIG. 5) is located at a position farther from center C1 of main journal part 2a than fastening bolt 24b securing bearing cap 17 at the side away from the cylinder center axis (the left side in FIG. 5), thereby making the bearing cap securing force on the side toward the cylinder center axis from main bearing part 18 (or main journal part 2a) larger than the bearing cap securing force on the side away from the cylinder center axis.

In the third embodiment, fastening bolt 24a securing bearing cap 17 at the cylinder center axis side and fastening bolt 24b securing bearing cap 17 at the side away from the cylinder center axis are located to have a distance identical to each other with respect to position Q at which load F4 acting on center C1 of main journal part 2a is to act on main bearing part 18 of bearing cap 17.

In the third embodiment, the bearing cap securing force on the side toward the cylinder center axis is designed so as not to generate a gap at the cylinder center axis side of bearing cap 17 when the maximum compressive load is generated. Meanwhile, the bearing cap securing force on the side away from the cylinder center axis is designed smaller than the bearing cap securing force on the side toward the cylinder center axis so as to prevent bearing cap 17 from generating a gap at the side away from the cylinder center axis.

With this, it is possible in the third embodiment to prevent the occurrence of a gap originating from contact surface 19 formed between bearing cap 17 and bulkhead 7, even if bearing cap 17 is subjected to deformations resulting from load F4 as discussed above.

Moreover, in the third embodiment, all of fastening bolts 24a, 24b for securing bearing cap 17 to bulkhead 7 are fastened with the same axial force, which makes the management of axial forces of fastening bolts convenient and therefore improves the workability at the time of securing bearing cap 17 to bulkhead 7.

Additionally, it is possible to relatively decrease the axial force of fastening bolt 24a securing the cylinder center axis side requiring a relatively large bearing cap securing force by making the axial forces of all of fastening bolts 24a, 24b identical; therefore, the hardness, strength and the like required of a bearing surface of a bolt disposed on the cylinder center axis side of bearing cap 17 can be decreased relatively.

The present invention is not limited to these embodiments, and therefore the arrangement may suitably be modified such that the bearing cap securing force of bearing cap 17 at the side toward the cylinder center axis gets greater than the bearing cap securing force of bearing cap 17 at the side away from the cylinder center axis.

Additionally, in the case where such deformations as to generate a gap at contact surface 19 formed between bearing cap 17 and bulkhead 7 may be caused, it is also possible to provide the internal combustion engine with a balancer shaft by a means as discussed in the above-mentioned embodiments thereby to prevent the occurrence of a gap originating from contact surface 19 formed between bearing cap 17 and bulkhead 7.

The invention claimed is:

1. An internal combustion engine comprising a first bearing cap secured to a cylinder block by fastening bolts and a crankshaft rotatably supported by the first bearing cap and the cylinder block, the cylinder block having a cylinder center axis offset relative to a rotation center of the crankshaft,
    wherein a product of a distance from a center axis of the fastening bolts to the rotation center of the crankshaft and an axial force of the fastening bolts is defined as a bearing cap securing force,
    when viewed from an axial direction of the crankshaft, a bearing cap securing force on a side toward the cylinder center axis from the rotation center of the crankshaft is larger than a bearing cap securing force on a side away from the cylinder center axis or a side having no cylinder center axis,
    the first bearing cap is secured by two fastening bolts on the side toward the cylinder center axis while being secured by one fastening bolt on the side away from the cylinder center axis,
    the first bearing cap has a cylinder block-side contact surface brought into contact with the cylinder block, and a top end surface opposite to the contact surface,
    the first bearing cap is partially cut out at a cylinder center axis-side end of the top end surface to have a cutout portion at which the first bearing cap is secured to the cylinder block by an outer fastening bolt of the two fastening bolts disposed on the side toward the cylinder center axis, the outer fastening bolt having a distance from the rotation center of the crankshaft larger than a distance of an inner fastening bolt of the two fastening bolts from the rotation center of the crankshaft, and
    the outer fastening bolt of the two fastening bolts securing the first bearing cap on the side toward the cylinder center axis is smaller in length than the inner fastening bolt of the two fastening bolts.

2. An internal combustion engine as claimed in claim 1, further comprising a second hearing cap secured to the first bearing cap,
    wherein the fastening bolts securing the first bearing cap on the side toward the cylinder center axis includes: a first fastening bolt securing the first bearing cap to the cylinder block while securing the second bearing cap to the first bearing cap; and a second fastening bolt securing the first bearing cap to the cylinder block, and
    the fastening bolt securing the first bearing cap on the side away from the cylinder center axis serves as a third fastening bolt securing the first bearing cap to the cylinder block while securing the second bearing cap to the first bearing cap.

3. An internal combustion engine as claimed in claim 1, wherein all of the fastening bolts are secured with the same axial force.

4. An internal combustion engine as claimed in claim 1, further comprising a multi-link type piston crank mechanism comprising: an upper link connected at its one end to a piston pin of a piston; a lower link connected to the upper link and a crankpin of the crankshaft; a control shaft extending generally parallel with the crankshaft; and a control link swingably connected at its one end to an eccentric shaft section disposed eccentric with respect to a rotation center of the control shaft while being connected at the other end to the lower link, thereby making the top dead center position of the piston adjustable according to a rotation position of the control shaft, wherein the control shaft is rotatably supported by the first bearing cap and a second bearing cap secured to the first bearing cap, and the fastening bolts securing the first bearing cap to the cylinder block include a fastening bolt securing the second bearing cap to the first bearing cap.

* * * * *